(12) United States Patent
Cross et al.

(10) Patent No.: US 6,443,469 B1
(45) Date of Patent: Sep. 3, 2002

(54) CHILD STROLLER APPARATUS

(76) Inventors: Rich Cross, 36 Long Meadow Rd., Bedford, NY (US) 10506; Donna Cross, 36 Long Meadow Rd., Bedford, NY (US) 10506

( * ) Notice: Subject to any disclaimer, the term of this patent is extended or adjusted under 35 U.S.C. 154(b) by 0 days.

(21) Appl. No.: 09/871,785

(22) Filed: Jun. 1, 2001

(51) Int. Cl.[7] ................................................ B62B 7/04
(52) U.S. Cl. ........................ 280/47.4; 280/62; 280/282
(58) Field of Search ........................ 280/47.38, 47.24, 280/47.25, 47.33, 47.4, 47.35, 62, 282, 304.1, 293; D12/112, 113, 109

(56) References Cited

U.S. PATENT DOCUMENTS

| | | | |
|---|---|---|---|
| D158,455 S | * | 5/1950 | Glamb ........................ D34/15 |
| D280,890 S | * | 10/1985 | Trudo et al. ................ D12/112 |
| 5,029,891 A | | 7/1991 | Jacobs |
| 5,123,670 A | | 6/1992 | Chen |
| 5,224,720 A | | 7/1993 | Chaw et al. |
| 5,306,030 A | * | 4/1994 | Becka ........................ 280/282 |
| 5,499,835 A | * | 3/1996 | Skirchak, Jr. et al. ....... 280/293 |
| 5,863,058 A | | 1/1999 | Jinks |
| D405,031 S | | 2/1999 | Li |
| 6,302,421 B1 | * | 10/2001 | Lee ............................ 280/210 |

* cited by examiner

Primary Examiner—Daniel G. DePumpo
Assistant Examiner—Tony Winner

(57) ABSTRACT

A child stroller apparatus for allowing the child to either ride in the seat member or upon a seat just like a bicycle. The child stroller apparatus includes a seat assembly; and also includes a storage member depending from the seat assembly; and further includes a rear wheel assembly being mounted to the storage member; and also includes a canopy member being removably mounted to the seat assembly; and further includes a handle assembly including a handle member being securely attached to the seat assembly; and also includes a bicycle frame assembly being securely attached to the storage member; and further includes a seat member being mounted upon the bicycle frame assembly; and further includes a steering assembly being attached to the bicycle frame assembly.

19 Claims, 3 Drawing Sheets

CHILD STROLLER APPARATUS

BACKGROUND OF THE INVENTION

1. Field of the Invention

The present invention relates to infant strollers and more particularly pertains to a new child stroller apparatus for allowing the child to either ride in the seat member or upon a seat just like a bicycle.

2. Description of the Prior Art

The use of infant strollers is known in the prior art. More specifically, infant strollers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,123,670; U.S. Pat. No. 5,863,058; U.S. Pat. No. 5,306,030; U.S. Pat. No. 5,029,891; U.S. Pat. No. Des. 405,031; and U.S. Pat. No. 5,224,720.

While these devices fulfill their respective, particular objectives and requirements, the aforementioned patents do not disclose a new child stroller apparatus. The inventive device includes a seat assembly; and also includes a storage member depending from the seat assembly; and further includes a rear wheel assembly being mounted to the storage member; and also includes a canopy member being removably mounted to the seat assembly; and further includes a handle assembly including a handle member being securely attached to the seat assembly; and also includes a bicycle frame assembly being securely attached to the storage member; and further includes a seat member being mounted upon the bicycle frame assembly; and further includes a steering assembly being attached to the bicycle frame assembly.

In these respects, the child stroller apparatus according to the present invention substantially departs from the conventional concepts and designs of the prior art, and in so doing provides an apparatus primarily developed for the purpose of allowing the child to either ride in the seat member or upon a seat just like a bicycle.

SUMMARY OF THE INVENTION

In view of the foregoing disadvantages inherent in the known types of infant strollers now present in the prior art, the present invention provides a new child stroller apparatus construction wherein the same can be utilized for allowing the child to either ride in the seat member or upon a seat just like a bicycle.

The general purpose of the present invention, which will be described subsequently in greater detail, is to provide a new child stroller apparatus which has many of the advantages of the infant strollers mentioned heretofore and many novel features that result in a new child stroller apparatus which is not anticipated, rendered obvious, suggested, or even implied by any of the prior art infant strollers, either alone or in any combination thereof.

To attain this, the present invention generally comprises a seat assembly; and also includes a storage member depending from the seat assembly; and further includes a rear wheel assembly being mounted to the storage member; and also includes a canopy member being removably mounted to the seat assembly; and further includes a handle assembly including a handle member being securely attached to the seat assembly; and also includes a bicycle frame assembly being securely attached to the storage member; and further includes a seat member being mounted upon the bicycle frame assembly; and further includes a steering assembly being attached to the bicycle frame assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new child stroller apparatus which has many of the advantages of the infant strollers mentioned heretofore and many novel features that result in a new child stroller apparatus which is not anticipated, rendered obvious, suggested, or even implied by any of the prior art infant strollers, either alone or in any combination thereof.

It is another object of the present invention to provide a new child stroller apparatus which may be easily and efficiently manufactured and marketed.

It is a further object of the present invention to provide a new child stroller apparatus which is of a durable and reliable construction.

An even further object of the present invention is to provide a new child stroller apparatus which is susceptible of a low cost of manufacture with regard to both materials and labor, and which accordingly is t hen susceptible of low prices of sale to the consuming public, thereby making such child stroller apparatus economically available to the buying public.

Still yet another object of the present invention is to provide a new child stroller apparatus which provides in the apparatuses and methods of the prior art some of the advantages thereof, while simultaneously overcoming some of the disadvantages normally associated therewith.

Still another object of the present invention is to provide a new child stroller apparatus for allowing the child to either ride in the seat member or upon a seat just like a bicycle.

Yet another object of the present invention is to provide a new child stroller apparatus which includes a seat assembly; and also includes a storage member depending from the seat assembly; and further includes a rear wheel assembly being mounted to the storage member; and also includes a canopy member being removably mounted to the seat assembly; and further includes a handle assembly including a handle member being securely attached to the seat assembly; and also includes a bicycle frame assembly being securely attached to the storage member; and further includes a seat member being mounted upon the bicycle frame assembly; and further includes a steering assembly being attached to the bicycle frame assembly.

Still yet another object of the present invention is to provide a new child stroller apparatus that is easy and convenient to set up and use.

Even still another object of the present invention is to provide a new child stroller apparatus that keeps the child from getting bored by allowing the child to steer a wheel like that of a bicycle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
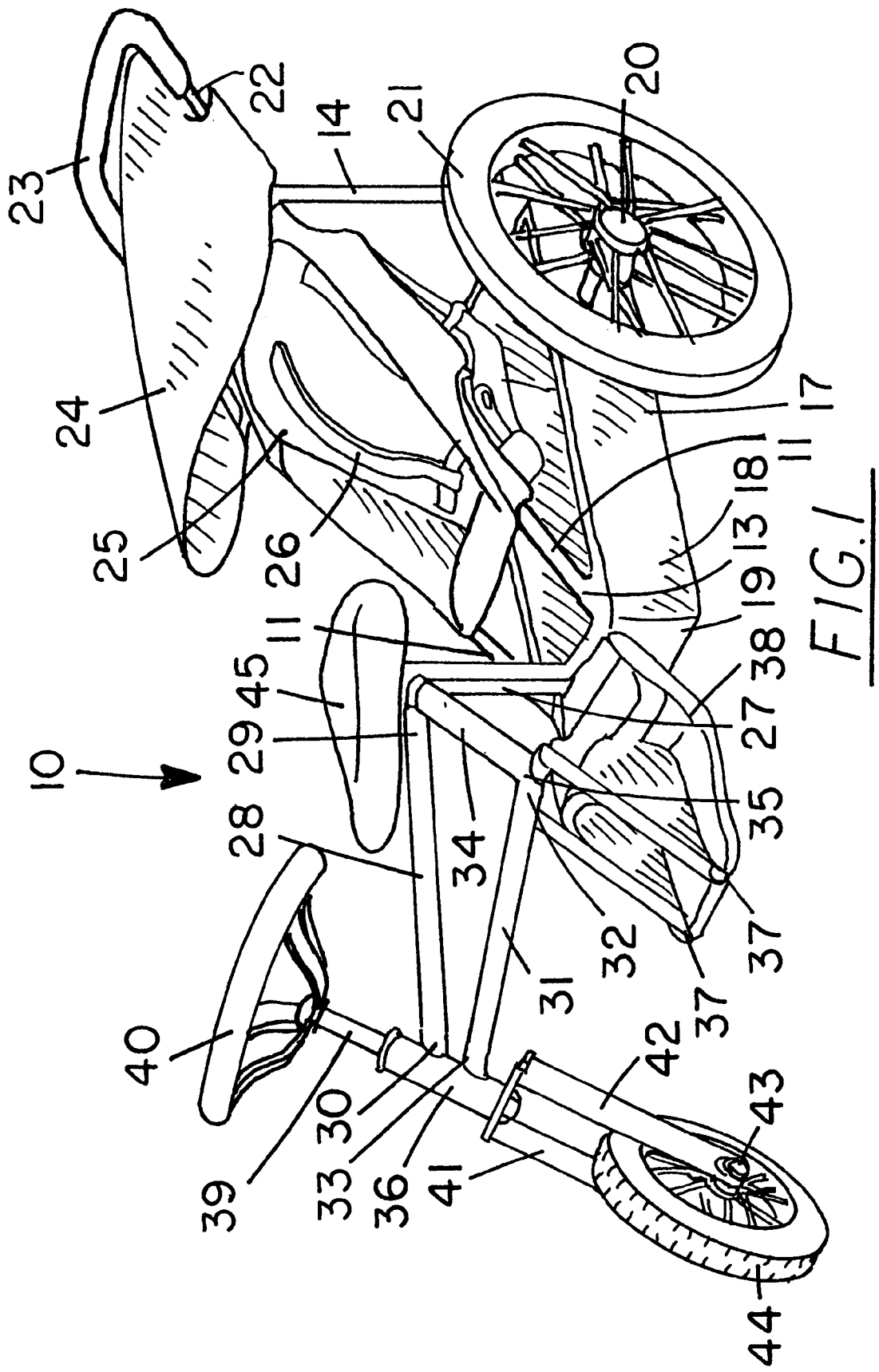
FIG. 1 is a perspective view of a new child stroller apparatus according to the present invention.
Figure 2:
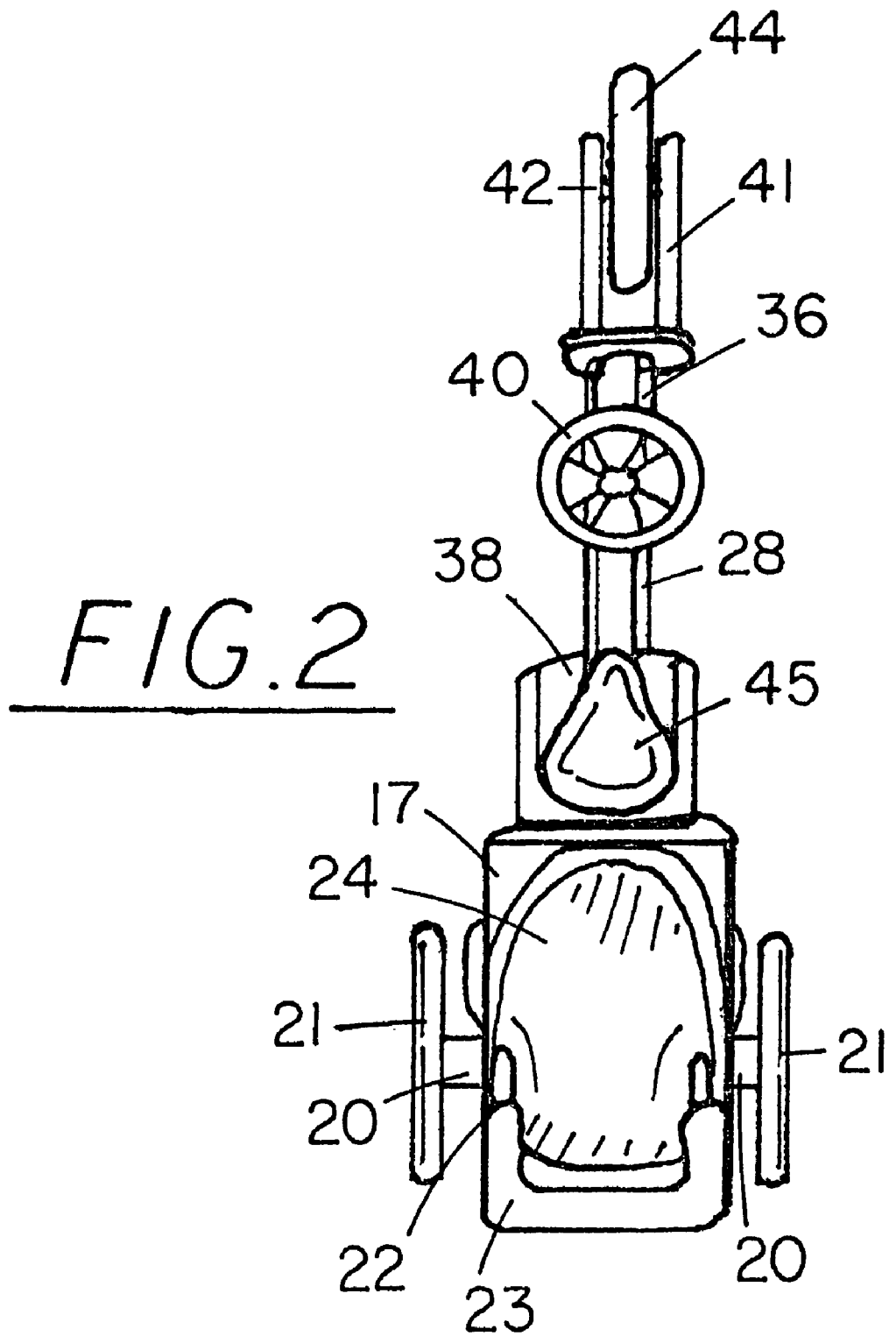
FIG. 2 is a top plan view of the present invention.
Figure 3:
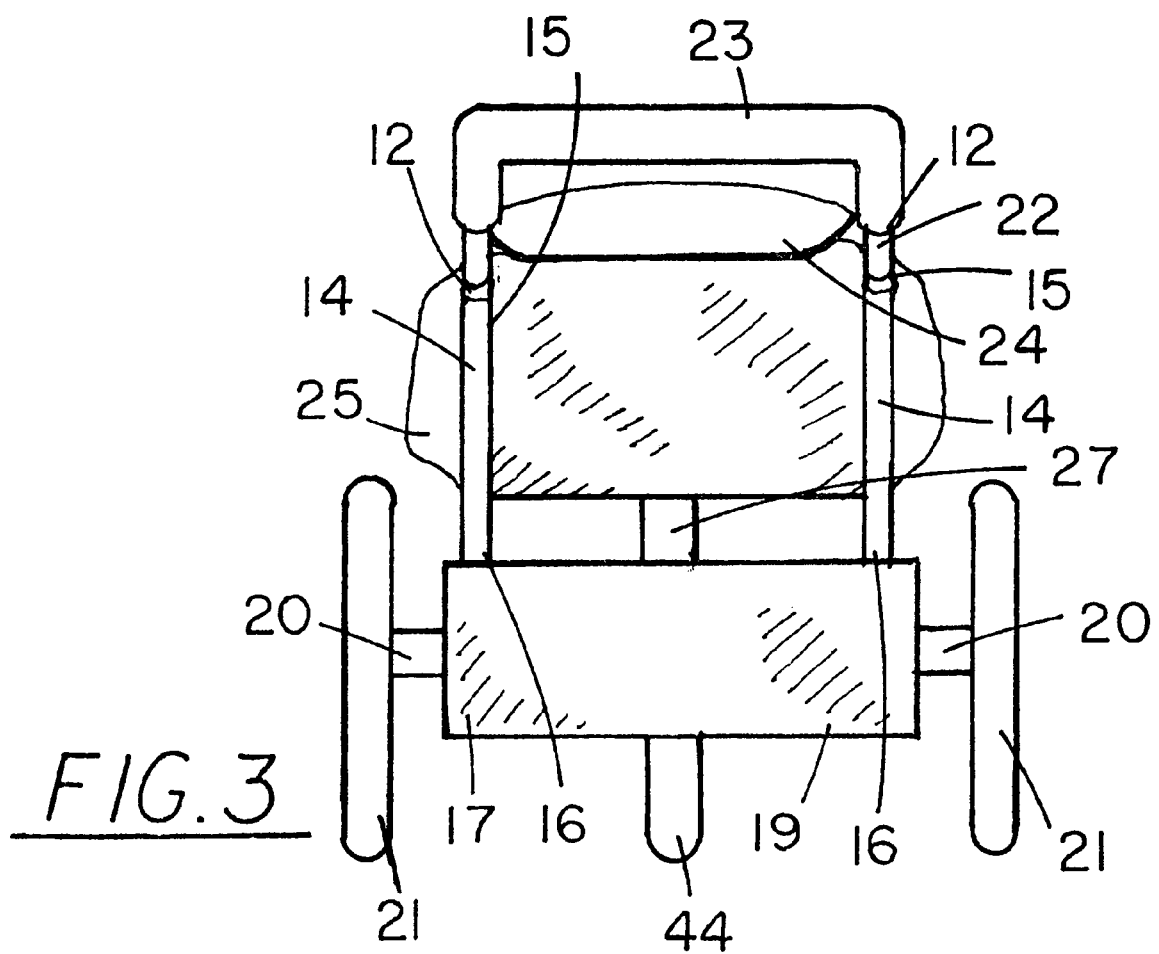
FIG. 3 is a rear elevational view of the present invention.

With reference now to the drawings, and in particular to FIGS. 1 through 3 thereof, a new child stroller apparatus embodying the principles and concepts of the present invention and generally designated by the reference numeral 10 will be described.

As best illustrated in FIGS. 1 through 3, the child stroller apparatus 10 generally comprises a seat assembly, the seat assembly including elongate front support members 11 having first ends 12 and second ends 13 and also includes elongate back support members 14 having first ends 15 and second ends 16. The seat assembly further includes a seat 25 being conventionally mounted to the elongate front support members 11, and also includes restraining straps 26 being conventionally attached to the seat 25 for restraining a child in the seat 25. The seat 25 has side walls with curved upper portions with, the curved upper portions being disposed about the elongate front support members 11.

A storage member 17 conventionally depends from the seat assembly. The storage member 17 includes a bottom wall, side and end walls 18,19. The second ends 13,16 of the elongate front and back support members 11,14 are securely and conventionally attached and welded to the side walls 18 of the storage member 17 with the seat 25 being suspended above the storage member 17.

A rear wheel assembly is conventionally mounted to the storage member 17. The rear wheel assembly includes stub axles 20 being securely and conventionally attached to the side walls 18 of the storage member 17, and also includes wheel members 21 being conventionally mounted upon the stub axles 20. A canopy member 24 is removably and conventionally mounted to the seat assembly. The canopy member 24 is removably mounted to the first ends 12,15 of the elongate front and back support members 11,14 and is disposed above the seat 25. A handle assembly includes a handle member 22 being securely and conventionally attached to the seat assembly. The handle assembly extends from the first ends 12,15 of the elongate front and back support members 11,14 and includes a pad member 23 being conventionally disposed about the handle member 22.

A bicycle frame assembly is securely and conventionally attached to the storage member 17. The bicycle frame assembly includes an elongate seat support member 27 being securely and conventionally attached to one of the end walls 19 of the storage member 17, and also includes an elongate first support member 28 having a first end 29 securely and conventionally attached to near a top end of the elongate seat support member 27, and further includes a cross member 34 having a top end which is securely and conventionally attached to near the top end of the elongate seat support member 27, and also includes an elongate second support member 31 having a first end 32 being securely and conventionally attached to near a bottom end 35 of the cross member 34, and further includes a tubular member 36 being securely and conventionally attached to second ends 30,33 of the elongate first and second support members 28,31. The bicycle frame assembly also includes a foot rest 37,38 being securely and conventionally attached to one of the end walls 19 of the storage member 17 and being suspended from the bottom end 35 of the cross member 34. The foot rest 37,38 includes platform support members 37 and a platform 38 being securely and conventionally attached to the platform support members 37

A seat member 45 is conventionally mounted upon the bicycle frame assembly. The seat member 45 is securely mounted upon the top end of the elongate seat support member 27. A steering assembly is conventionally attached to the bicycle frame assembly. The steering assembly includes an elongate steering support member 39 being rotatably disposed through the tubular member 36, and also includes a steering wheel 40 being conventionally mounted upon a top end of the elongate steering support member 39, and further includes bracket members 41,42 being spaced apart and being conventionally attached to a bottom end of the elongate steering support member 39, and also includes an axle member 43 being conventionally mounted to and disposed between ends of the bracket members 41,42, and further includes a front wheel 44 being rotatably mounted to the axle member 43 and being disposed between the bracket members 41,42.

In use, the user secures the child in the seat 25 and pushes the child stroller apparatus 10 from behind. If the child gets bored, the user can put the child on the seat member 45 whereupon the child can pretend to ride a bicycle by grasping the steering wheel 40 and steering the child stroller apparatus 10 while the user pushes from behind.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, unction and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A child stroller apparatus comprising: a seat assembly, said seat assembly including elongate front support members having first ends and second ends and also includes elongate back support members having first ends and second ends, said seat assembly further includes a seat being mounted to said elongate front support members, and also including restraining straps being attached to said seat for restraining a child in said seat, said seat having side walls with curved upper portions, said curved upper portions being disposed about said elongate front support members;

a storage member depending from said seat assembly, said storage member including a bottom wall, side and end walls, said second ends of said elongate front and back support members being securely attached to said side walls of said storage member with said seat being suspended above said storage member;

a rear wheel assembly being mounted to said storage member, said rear wheel assembly including stub axles being securely attached to said side walls of said storage member, and also including wheel members being mounted upon said stub axles;

a canopy member being removably mounted to said seat assembly, said canopy member being removably mounted to said first ends of said elongate front and back support members and being disposed above said seat;

a handle assembly including a handle member being securely attached to said seat assembly, said handle assembly extending from said first ends of said elongate front and back support members and including a pad member being disposed about said handle member;

a bicycle frame assembly being securely attached to said storage member, said bicycle frame assembly including an elongate seat support member being securely attached to one of said end walls of said storage member, and also including an elongate first support member having a first end securely attached to near a top end of said elongate seat support member, and further including a cross member having a top end which is securely attached to near said top end of said elongate seat support member, and also including an elongate second support member having a first end being securely attached to near a bottom end of said cross member, and further including a tubular member being securely attached to second ends of said elongate first and second support members, said bicycle frame assembly also including a foot rest being securely attached to one of said end walls of said storage member and being suspended from said bottom end of said cross member, said foot rest including platform support members and a platform being securely attached to said platform support members;

a seat member being mounted upon said bicycle frame assembly, said seat member being securely mounted upon said top end of said elongate seat support member; and a steering assembly being attached to said bicycle frame assembly, said steering assembly including an elongate steering support member being rotatably disposed through said tubular member, and also including a steering wheel being mounted upon a top end of said elongate steering support member, and further including bracket members being spaced apart and being attached to a bottom end of said elongate steering support member, and also including an axle member being mounted to and disposed between ends of said bracket members, and further including a front wheel being rotatably mounted to said axle member and being disposed between said bracket members.

2. A child stroller apparatus comprising:

a seat assembly;

a storage member depending from said seat assembly;

a rear wheel assembly being mounted to said storage member;

a canopy member being removably mounted to said seat assembly;

a handle assembly including a handle member being securely attached to said seat assembly;

a bicycle frame assembly being securely attached to said storage member;

a seat member being mounted upon said bicycle frame assembly; and a steering assembly being attached to said bicycle frame assembly;

wherein said seat assembly includes elongate front support members having first ends and second ends and also includes elongate back support members having first ends and second ends, said seat assembly further includes a seat being mounted to said elongate front support members, and also including restraining straps being attached to said seat for restraining a child in said seat, said seat having side walls with curved upper portions, said curved upper portions being disposed about said elongate front support members.

3. A child stroller apparatus as described in claim 2, wherein said canopy member is removably mounted to said first ends of said elongate front and back support members and is disposed above said seat.

4. A child stroller apparatus as described in claim 2, wherein said handle assembly extends from said first ends of said elongate front and back support members and includes a pad member being disposed about said handle member.

5. A child stroller apparatus as described in claim 2, wherein said storage member includes a bottom wall, side and end walls, said second ends of said elongate front and back support members being securely attached to said side walls of said storage member with said seat being suspended above said storage member.

6. A child stroller apparatus as described in claim 5, wherein said rear wheel assembly includes stub axles being securely attached to said side walls of said storage member, and also includes wheel members being mounted upon said stub axles.

7. A child stroller apparatus as described in claim 5, wherein said bicycle frame includes an elongate seat support member being securely attached to one of said end walls of said storage member, and also includes an elongate first support member having a first end securely attached to near a top end of said elongate seat support member, and further includes a cross member having a top end which is securely attached to near said top end of said elongate seat support member, and also includes an elongate second support member having a first end being securely attached to near a bottom end of said cross member, and further includes a tubular member being securely attached to second ends of said elongate first and second support members.

8. A child stroller apparatus as described in claim 7, wherein said bicycle frame assembly also includes a foot rest being securely attached to one of said end walls of said storage member and being suspended from said bottom end of said cross member, said foot rest including platform support members and a platform being securely attached to said platform support members.

9. A child stroller apparatus as described in claim 7, wherein said seat member is securely mounted upon said top end of said elongate seat support member.

10. A child stroller apparatus as described in claim 7, wherein said steering assembly includes an elongate steering support member being rotatably disposed through said tubular member, and also includes a steering wheel being mounted upon a top end of said elongate steering support member, and further includes bracket members being spaced apart and being attached to a bottom end of said elongate steering support member, and also includes an axle member being mounted to and disposed between ends of said bracket members, and further includes a front wheel being rotatably mounted to said axle member and being disposed between said bracket members.

11. A child stroller apparatus comprising:

a seat assembly;

a storage member depending from said seat assembly;

a rear wheel assembly being mounted to said storage member;

a bicycle frame assembly being securely attached to said storage member;

a seat member being mounted upon said bicycle frame assembly; and a steering assembly being attached to said bicycle frame assembly:

wherein said seat assembly includes elongate front support members having first ends and second ends and elongate back support members having first ends and second ends, said seat assembly further includes a seat being mounted to said elongate front support members, and also including restraining straps being attached to said seat for restraining a child in said seat, said seat having side walls with curved upper portions, said curved upper portions being disposed about said elongate front support members.

12. A child stroller apparatus as described in claim 11, wherein said storage member includes a bottom wall side and end walls, said second ends of said elongate front and back support members being attached to said side walls of said storage member with said seat being suspended above said storage member.

13. A child stroller apparatus as described in 11, wherein said rear wheel assembly includes stub axles attached to said storage member and also includes wheel members being mounted upon said stub axles.

14. A child stroller apparatus as described in claim 11, additionally comprising a canopy member being removably mounted to said seat assembly, said canopy member being removably mounted on said elongate front and back support members and being disposed above said seat.

15. A child stroller apparatus as described in claim 11, additionally comprising a handle assembly including a handle member being securely attached to said seat assembly, said handle assembly extending from said first ends of said elongate front and back support members and including a pad member being disposed about said handle member.

16. A child stroller apparatus as described in claim 11, wherein said bicycle frame includes an elonoate seat support member being attached to said storage member, and also includes an elongate first support member having a first end attached to near a top end of said elongate seat support member, and further includes a cross member having a top end which is attached to said elongate seat support member, and also includes an elongate second support member having a first end being attached to near a bottom end of said cross member, and further includes a tubular member being attached to said elongate first and second support members.

17. A child stroller apparatus as described in claim 16, wherein said bicycle frame assembly also includes a foot rest being attached to said storage member and being suspend ed from said bottom end of said cross member said foot rest including platform support members and a platform being attached to said platform support members.

18. A child stroller apparatus as described in claim 16, wherein said seat member is mounted upon said elongate seat support member.

19. A child stroller apparatus as described in claim 16, wherein said steering assembly includes an elongate steering support member being rotatably disposed through said tubular member, a steering wheel being mounted upon a top end of said elongate steering support member, bracket members being spaced apart and being attached to a bottom end of said elongate steering support member, an axle member being mounted to and disposed between ends of said bracket members, and further includes a front wheel being rotatably mounted to said axle member and being disposed between said bracket members.

* * * * *